United States Patent
Kulkarni et al.

(10) Patent No.: US 9,114,343 B2
(45) Date of Patent: Aug. 25, 2015

(54) HEADER FRAME DESIGN FOR FILTER ELEMENT

(75) Inventors: Abhijeet Madhukar Kulkarni, Alencon Link (GB); Richard Michael Ashley Mann, Popley (GB); Philip John Montague, Southhampton (GB); Kevin Anthony Saunders, Caversham Reading (GB); Stephen David Hiner, Salisbury (GB); Marcus Carr Walters, Ash Green (GB)

(73) Assignee: BHA Altair, LLC, Franklin, TN (US)

( * ) Notice: Subject to any disclaimer, the term of this patent is extended or adjusted under 35 U.S.C. 154(b) by 783 days.

(21) Appl. No.: 13/241,639

(22) Filed: Sep. 23, 2011

(65) Prior Publication Data
US 2013/0074463 A1    Mar. 28, 2013

(51) Int. Cl.
*B01D 46/00* (2006.01)
*B01D 46/02* (2006.01)
*B01D 46/12* (2006.01)

(52) U.S. Cl.
CPC ........ *B01D 46/0005* (2013.01); *B01D 46/0002* (2013.01); *B01D 46/023* (2013.01); *B01D 46/12* (2013.01); *B01D 46/125* (2013.01); *Y10T 29/49826* (2015.01)

(58) Field of Classification Search
CPC ........... B01D 46/0002; B01D 46/0005; B01D 46/002; B01D 46/023; B01D 46/12; B01D 46/125; B01D 46/10
USPC ............ 55/483, 484, 495, 497, DIG. 31, 511
See application file for complete search history.

(56) References Cited

U.S. PATENT DOCUMENTS

| | | | |
|---|---|---|---|
| 4,056,375 A | 11/1977 | Ringel et al. | |
| 5,192,347 A | 3/1993 | Lee | |
| 5,298,044 A * | 3/1994 | Sutton et al. | 55/378 |
| 5,464,461 A | 11/1995 | Whitson et al. | |
| 6,485,538 B1 * | 11/2002 | Toyoshima | 55/490 |
| 6,676,721 B1 * | 1/2004 | Gillingham et al. | 55/302 |
| 6,908,494 B2 * | 6/2005 | Gillingham et al. | 55/283 |
| 8,157,882 B2 * | 4/2012 | Curtis et al. | 55/505 |
| 2010/0015904 A1 | 1/2010 | Yeh et al. | |
| 2010/0031616 A1 * | 2/2010 | Gillingham et al. | 55/302 |
| 2010/0251681 A1 * | 10/2010 | Gebert | 55/495 |
| 2012/0055127 A1 * | 3/2012 | Holzmann et al. | 55/484 |
| 2013/0062276 A1 * | 3/2013 | Barreteau et al. | 210/493.5 |

FOREIGN PATENT DOCUMENTS

EP    0888803 A2    1/1999

OTHER PUBLICATIONS

GB Search Report issued in connection with corresponding GB Application No. 1216402.6 dated Jan. 15, 2013.

* cited by examiner

*Primary Examiner* — Robert Clemente
(74) *Attorney, Agent, or Firm* — Reinhart Boerner Van Deuren P.C.

(57) ABSTRACT

A filtration unit and a method of installing a filtration unit are provided. The rectangular filtration unit includes a filter element for filtering fluid. The frame includes a first portion and a second portion. The frame supports the filter element and the frame defines an opening. A first dimension of the filtration unit measured between the exterior of the first portion and the opening is greater than a second dimension of the filtration unit measured between the exterior of the second portion and the opening. In a further example, the filtration unit is mounted in a top section and a bottom section of a holding frame.

6 Claims, 4 Drawing Sheets

HEADER FRAME DESIGN FOR FILTER ELEMENT

BACKGROUND OF THE INVENTION

1. Field of the Invention

The invention relates to a filtration apparatus header frame, and specifically relates to a filtration unit for ease of insertion into a holding frame.

2. Discussion of Prior Art

Filter elements can be used to provide clean fluid, such as air, to or from various devices. Such devices can include gas turbines. Filter elements can include mini-pleat filters and pocket filters. Filter elements can be held in place in a filtration apparatus by a filtration unit that rests in a filter frame within the filtration apparatus. However, new, more efficient filter elements have differing overall shapes which can provide installation difficulties or prevent installation of more efficient filter elements altogether. These difficulties discourage possible retrofits of existing filtration equipment with more efficient filter elements. Furthermore, the installation difficulties can result in reduced efficiency of the filtration apparatus when retrofitted with new filter element designs or cause damage to the filter elements. As a result, there are benefits for continual improvements in filter technologies so as to address these and other issues.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a filtration unit including a filter element for filtering fluid. The filtration unit also includes a rectangular frame. The rectangular frame includes a first portion and a second portion. The frame supports the filter element and the frame defines an opening. A first dimension of the filtration unit measured between the exterior of the first portion and the opening is greater than a second dimension of the filtration unit measured between the exterior of the second portion and the opening.

Another aspect of the invention provides a filtration unit including a filter element for filtering fluid. The filtration unit also includes a rectangular frame. The rectangular frame includes a first portion and a second portion. The frame supports the filter element and the frame defines an opening. A first dimension of the filtration unit measured between the exterior of the first portion and the opening is greater than a second dimension of the filtration unit measured between the exterior of the second portion and the opening. The filtration unit is mounted in a top section and a bottom section of a holding frame.

Another aspect of the invention provides a method of installing a filtration unit. The method includes providing a filter element for filtering fluid. The method further includes providing a rectangular frame including a first portion and a second portion. The frame supports the filter element, and the frame defines an opening. A first dimension of the filtration unit measured between the exterior of the first portion and the opening is greater than a second dimension of the filtration unit measured between the exterior of the second portion and the opening. The method further includes mounting the filtration unit in a top section and a bottom section of a holding frame.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
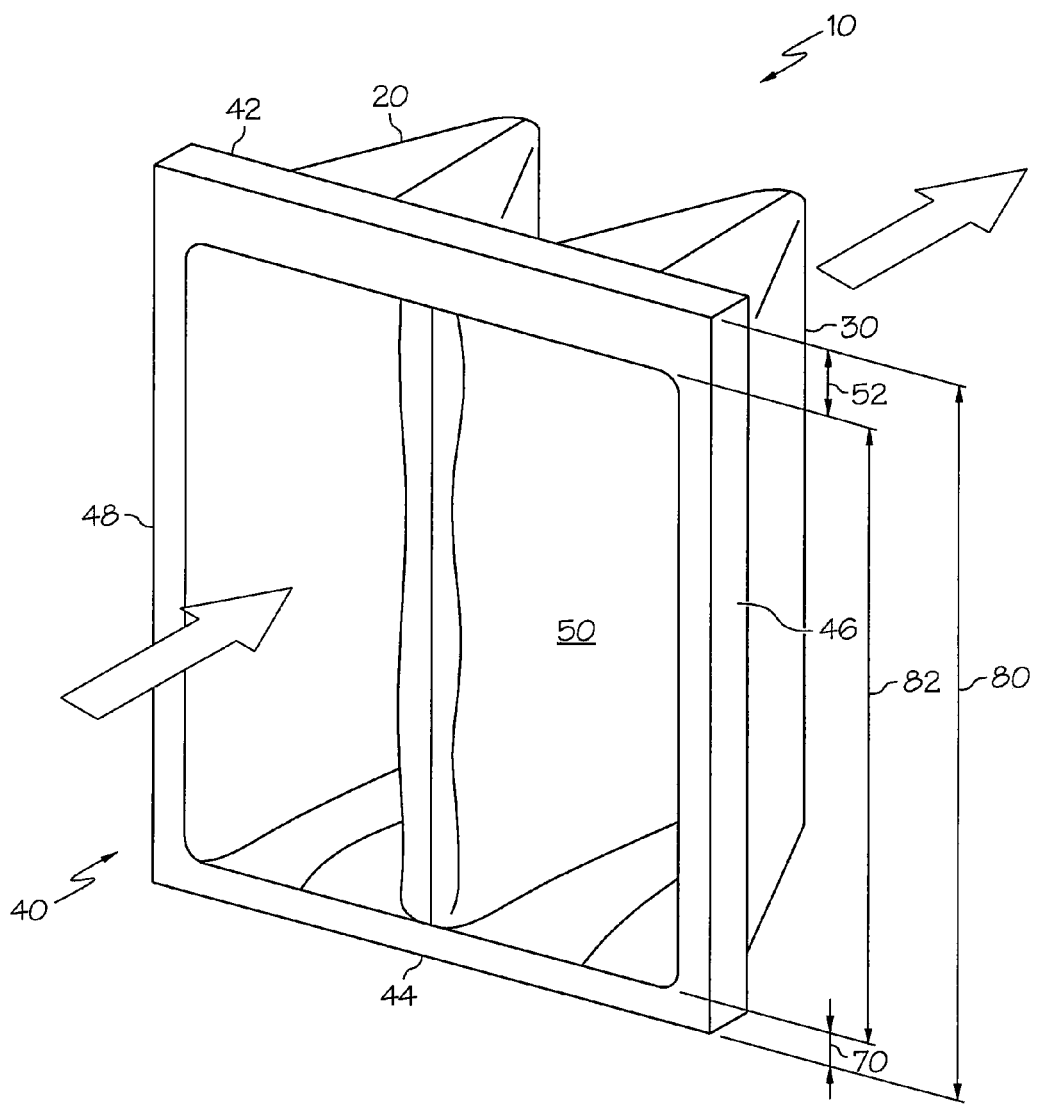
FIG. 1 is a perspective view of an example filtration unit including a pocket filter element.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

An example filtration unit to be used in a filter holding frame is generally designated 10 within FIG. 1. One example of a filter holding frame is an up and under filter holding frame. The up and under filter holding frame can also be known as a "lift and drop" filter holding frame and possibly other names. For convenience, this application will use the designation "up and under filter holding frame." The filtration unit 10 includes at least one filter element 20. The filter element 20 is configured for filtering fluid, such as liquid, air, and/or gas. For example, the air can be proceeding to a turbine, such as a gas turbine.

The filter element 20 includes a filter media 30. The filter media 30 is configured to collect particulate material, including but not limited to dust from the fluid flowing through the filter element 20. The filter media 30 can be formed from a variety of materials, such as fibers or a membrane, and can be formed by a variety of processes. The filter media 30 can include various types of media including but not limited to media that has been pleated and/or corrugated. In one example, the filter media 30 can be in the form of a "flat panel." Of course, one or more aspects of the filter media 30, such as material, construction, configuration, thickness, etc. can be varied. FIG. 1 depicts what is sometimes known as a pocket filter or bag filter located within the filtration unit 10.

The filtration unit 10 includes a frame 40 which includes a first portion 42 and a second portion 44 wherein the frame 40 has a rectangular configuration. The frame 40 at least partially surrounds the filter element 20. The frame 40 defines an opening 50 that provides at least one air flow opening to allow fluid to pass in the direction from a dirty side (upstream) to a clean side (downstream) of the filter media 30. Arrows designate the direction of fluid flow through the opening 50 in FIG. 1. The filter element 20 can be attached to the frame 40 in various ways. The first portion 42, second portion 44, third portion 46 and fourth portion 48 can provide a gasket surrounding the upstream edges of the filter element 20.

A first dimension 52 measured between the exterior of the first portion 42 and the opening is greater than a second dimension 70 measured between the exterior of the second portion 44 and the opening. The first dimension 52 and the second dimension 70 differ from those on known filtration units while maintaining a third dimension 80 of the filtration unit 10 and utilizing the same size filter element 20. The third dimension 80 is measured from the exterior of the first portion 42 to the exterior of the second portion 44. As a result of the increased first dimension 52 and the decreased second dimension 70, the opening 50 and the filter element 20 are shifted vertically downward. The vertical shift downward creates an asymmetrically located opening 50 between the exterior of the first portion 42 and the exterior the second portion 44. For example, the first dimension 52 can be increased by a determined length and the second dimension 70 can be decreased by the same determined length so that the third dimension 80 remains the same.

Previously known filtration unit designs can have a first dimension that is too short to allow the filtration unit to fully engage with the top section space. When the first dimension is too short, the filter element extending downstream from the filtration unit prevents the full insertion of the filtration unit into the top section which then prevents the second portion from easily rotating to position over the bottom section space and dropping into operating position. In that case, the operator may have to expend extra energy to force the filtration unit to rotate and can bend or permanently damage the filtration unit and/or filter element in the process. Deformation of the filtration unit or the filter element can lead to inefficient filtration. In some instances, the filtration unit and filter element combination simply will not fit into the rear access holding frame.

Furthermore, when the first dimension is too short to allow the filtration unit to fully engage with the top section space, a portion of the filter element can be pinched between the first portion and the top section during filtration unit installation. The filter media can then be permanently damaged by tearing or deformation. A tear in the filter media can permit dust or other contaminants to easily flow from the upstream dirty side to the downstream clean side. These contaminants can both damage and reduce the efficiency of the downstream mechanical equipment. Conditions including deformation of the filtration unit, deformation of the filter element, and torn filter media can also permit water that is entrained in a gas flow to freely pass from the upstream dirty side to the downstream clean side. This can also reduce the efficiency of the downstream mechanical equipment. Both the pocket filter element and the mini-pleat V cell filter element can experience these problems.

The pocket filter element is also subject to a further problem relating to a first dimension that is too short. The filter media of a pocket filter element can remain pinched between the filtration unit first portion and the top section after the filtration unit is rotated and lowered into operating position. The presence of filter media between the filtration unit first portion and the top section reduces the possibility of an effective seal between the filtration unit and the top section. This condition can also permit dust or other contaminants to easily flow from the upstream dirty side of the fluid flow to the downstream clean side of the fluid flow. These contaminants can both damage and reduce the efficiency of the downstream mechanical equipment.

In one example, the difference between the first dimension 52 and the second dimension 70 is greater than 1% of the third dimension 80 of the filtration unit 10. For instance, a filtration unit 10 can have a first dimension 52 of about 26 mm and a second dimension 70 of about 18 mm. The third dimension 80 of the filtration unit 10 can be about 580 mm. The difference between the first dimension 52 and the second dimension 70 is 8 mm which is greater than 1% of the third dimension 80 which is 5.8 mm.

In another example, the first dimension 52 is greater than the second dimension 70 and the second dimension 70 is greater than the manufacturing tolerance for a fourth dimension 82. The fourth dimension 82 is measured between the first portion 42 and the second portion 44. For example, a filtration unit 10 can have a first dimension 52 of about 26 mm which is greater than a second dimension 70 of about 18 mm. The manufacturing tolerance for the fourth dimension 82 can be +/−3 mm over the length of about 540 mm.

Figure 2:
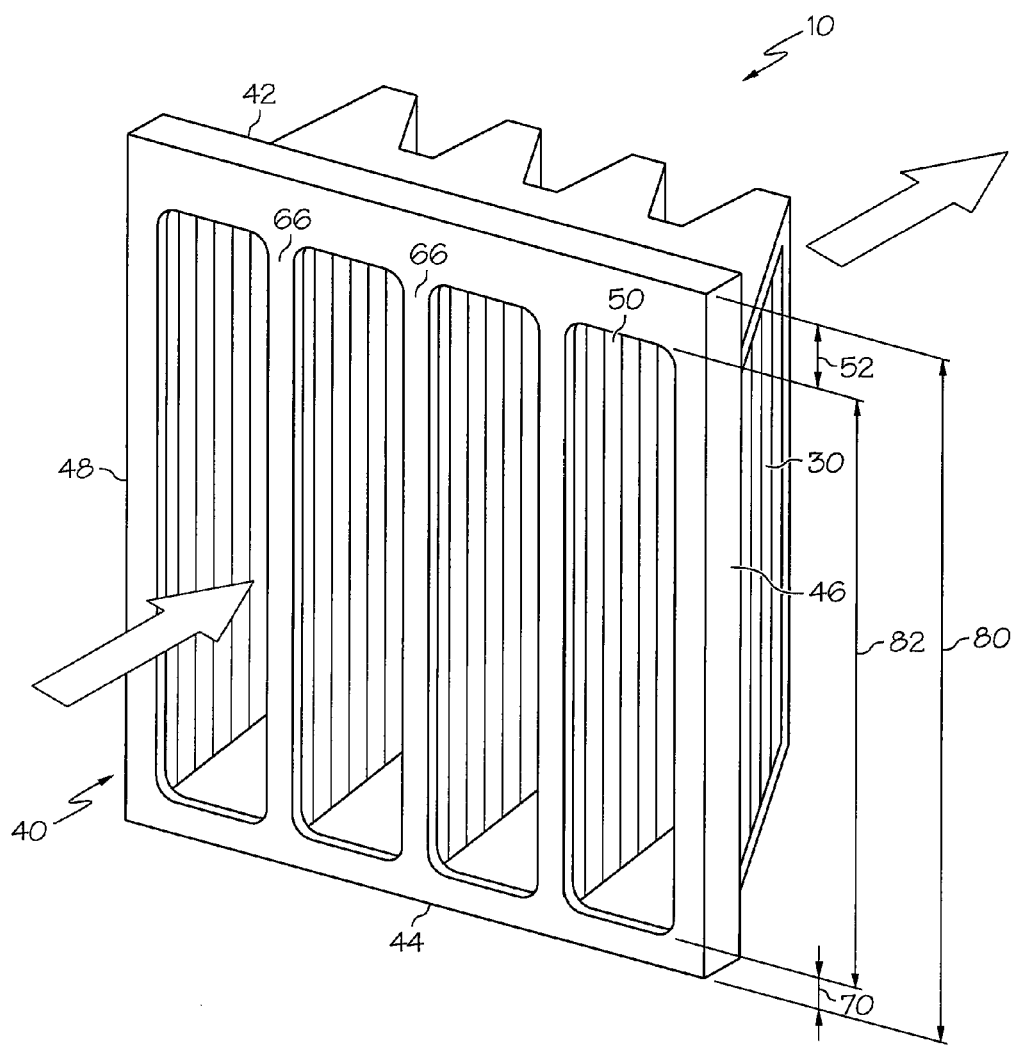
FIG. 2 is a perspective view of another example filtration unit including a mini-pleat V cell filter element.

Turning to FIG. 2, the frame 40 can further include at least one central portion 66 for creating a plurality of openings 50. The central portion 66 can divide the opening 50 into a plurality of equal-sized openings 50 or divide the opening 50 into various sizes and orientations. A filter element 20 can be placed to receive fluid flow from one single opening 50, or a filter element 20 can be placed to receive fluid flow from a plurality of openings 50. Additionally, the filtration unit 10 can include a plurality of filter elements 20. FIG. 2 depicts what is sometimes known as a mini-pleat V cell filter element located within the filtration unit 10.

Figure 3:
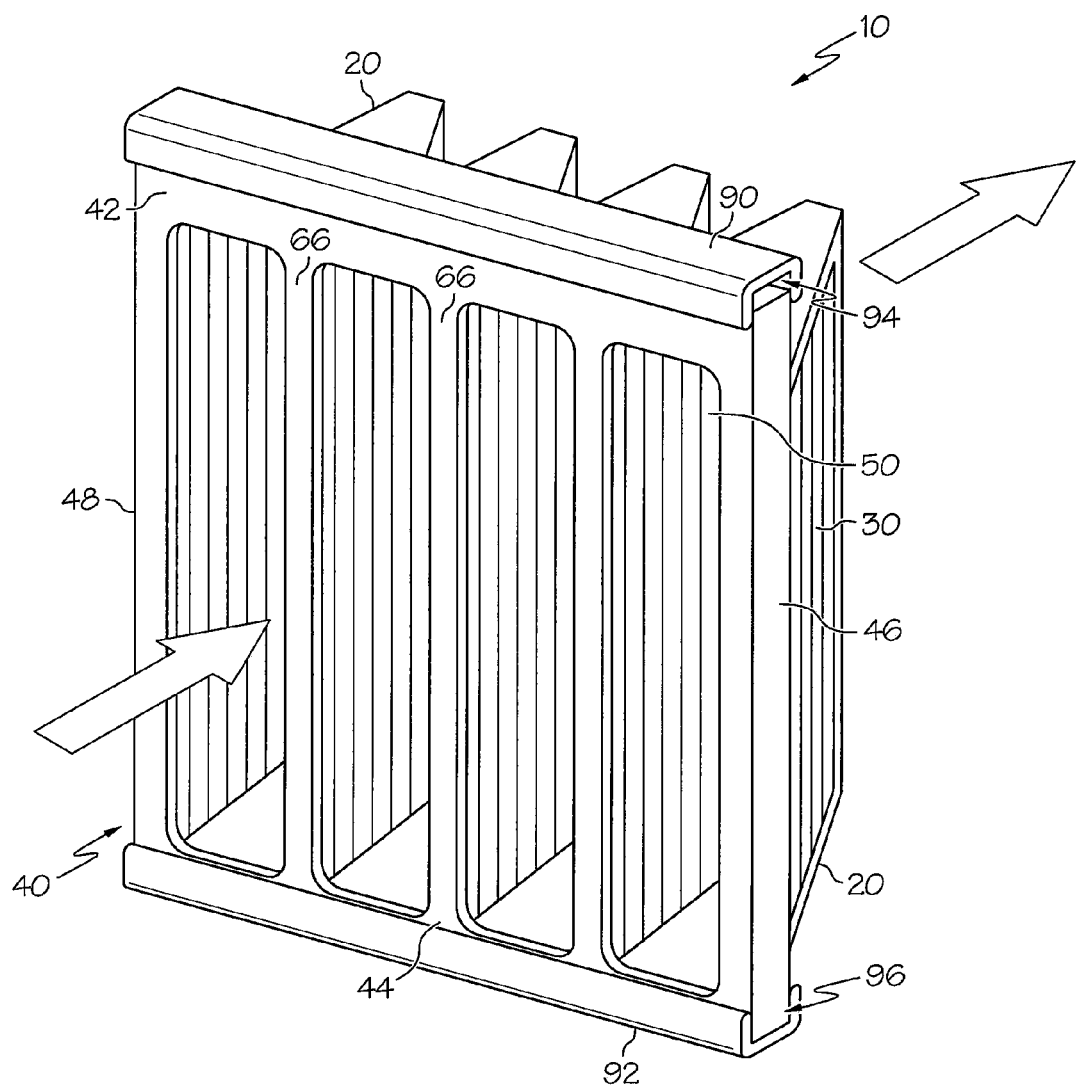
FIG. 3 is a perspective view of the example filtration unit of FIG. 2 inserted into an up and under filter holding frame.

FIG. 3 shows a filtration unit 10 located in an up and under filter holding frame. The up and under filter holding frame can include a top section 90 and a bottom section 92. The top section 90 bounds a top section space 94 on three sides with an open side facing downward. Much like the top section 90, the bottom section 92 bounds a bottom section space 96 on three sides, but an open side faces upward. The top section 90 and bottom section 92 can be constructed of structural channel, I-beam, or other similarly shaped materials. The up and under filter holding frame can be considered structural elements of a filtration apparatus or part of a larger system that includes filtration apparatus, such as a commercial gas turbine. A filtration apparatus can provide access to the up and under filter holding frame from the downstream side of the up and under filter holding frame. This access arrangement for the filtration apparatus is sometimes termed a rear access holding frame. FIGS. 1 and 2 both depict a filtration unit 10 and a filter element 20 designed for use with rear access holding frames.

Returning to FIG. 3, the filtration unit 10 is typically mounted in the rear access up and under filter holding frame by holding the filtration unit 10 generally upright with the second portion 44 slightly downstream of the first portion 42. The first portion 42 is then inserted into the top section space 94. The top section 90 is spaced from the bottom section 92 so that the filtration unit 10 can then be rotated about its first portion 42 to move the second portion 44 to a position above the bottom section space 96. The filtration unit 10 is then moved downward into the bottom section space 96 where the filtration unit 10 and filter element 20 remain during operation of the filtration equipment.

The described filtration unit 10 design including an increased first dimension 52 and a decreased second dimension 70 allows an existing filtration apparatus to utilize new, more efficient filter elements 20. An existing filtration apparatus may have been designed while considering only filtration units that completely encompassed the filter elements. This design would not give rise to an interference between the top section 90 structure and the filter element 20 that extends downstream of a filtration unit 10. However, with the development and implementation of more efficient filter elements 20, their designs have changed, leading to some filter element designs that extend downstream of the filtration unit 10. Attempts at placing a more efficient filter element 20 and a filtration unit 10 into an existing filtration apparatus led to interferences, filter element deformation, etc. However, the described filtration unit 10 design allows newer filter styles to be placed into an existing filtration apparatus without costly retrofit of access doors, up and under filter holding frames, etc. while promoting an effective seal between the filtration unit 10 and a top section 90 wall, decreasing the possibility of water and other fluids bypassing the filter element 20 when going through the filtration apparatus, and decreasing the possibility of filter media 30 pinching.

The desired length increase of the first dimension 52 is dependent upon the up and under filter holding frame design. Use of newer, more efficient filter element designs in an existing filter apparatus may require measurements of the up and under filter holding frame and the filtration unit 10 to determine required changes in the first dimension 52 and the corresponding changes in the second dimension 70. The required dimension increase can vary between different filtration apparatus manufacturers or different regions of the world.

Figure 4:
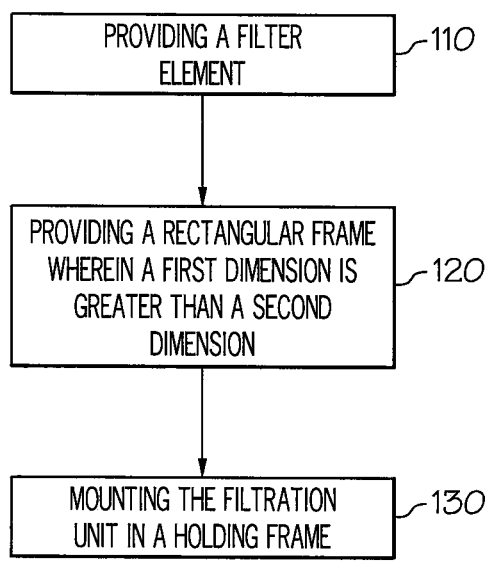
FIG. 4 is a top level flow diagram of a method of installing a filtration unit in accordance with an aspect of the present invention.

An example method of installing a filtration unit 10 is generally described in FIG. 4. The method can be performed in connection with the example filtration unit 10 shown in FIGS. 1-3. The method includes the step 110 of providing a filter element for filtering fluid. The filter element can include a filter media. The filter media is configured to collect particulate material, including but not limited to dust from the fluid flowing through the filter element.

The method further includes the step 120 of providing a rectangular frame including a first portion and a second portion. The frame supports the filter element and the frame defines an opening. A first dimension measured between the exterior of the first portion and the opening is greater than a second dimension measured between the exterior of the second portion and the opening.

The method further includes the step 130 of mounting the filtration unit in a top section and a bottom section of a holding frame. The holding frame can be considered structural elements of a filtration apparatus or part of a larger system that includes filtration apparatus, such as a commercial gas turbine. The filtration unit can be mounted in the holding frame by holding the filtration unit generally upright with the second portion slightly downstream of the first portion. The first portion is then inserted into the top section space. The top section is spaced from the bottom section so that the filtration unit can then be rotated about its first portion to move the second portion to a position above the bottom section space. The filtration unit is then moved downward into the bottom section space where the filtration unit and filter element remain during operation of the filtration equipment.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A method of installing a filtration unit, the method including:
   providing a filter element for filtering fluid;
   providing a rectangular frame including a first portion defining an upper-most peripheral edge of the frame, and a second portion defining a lower-most peripheral edge of the frame running parallel to the upper-most peripheral edge, the frame supports the filter element, and the frame defines at least one opening, the at least one opening providing a continuous and uninterrupted air entryway and having an upper edge adjacent and parallel to the upper-most peripheral edge and a lower edge adjacent and parallel to the lower-most peripheral edge,
   wherein a first dimension measured between the upper-most peripheral edge and the upper edge of the at least one opening is greater than a second dimension measured between the lower-most peripheral edge and the lower edge of the at least one opening; and
   mounting the filtration unit in a top section and a bottom section of a holding frame.

2. The method of installing a filtration unit according to claim 1, wherein the difference between the first dimension and the second dimension is greater than 1% of a third dimension measured between the exterior of the first portion and the exterior of the second portion.

3. The method of installing the filtration unit according to claim 2, wherein the first dimension is greater than the second dimension and the second dimension is greater than a manufacturing tolerance for a fourth dimension measured between the first portion and the second portion.

4. The method of installing the filtration unit according to claim 1, wherein the filter element includes filter media.

5. The method of installing the filtration unit according to claim 1, wherein the at least one opening includes a plurality of openings.

6. The method of installing the filtration unit according to claim 1, wherein the filtration unit includes a plurality of filter elements.

* * * * *